United States Patent [19]
Fukuzaki et al.

[11] Patent Number: 5,706,000
[45] Date of Patent: Jan. 6, 1998

[54] POSITION DETECTING DEVICE AND POSITION POINTING DEVICE THEREFOR

[75] Inventors: Yasuhiro Fukuzaki; Yuji Katsurahira, both of Saitama-ken, Japan

[73] Assignee: Wacom Co., Ltd., Saitama, Japan

[21] Appl. No.: 359,463

[22] Filed: Dec. 20, 1994

[30] Foreign Application Priority Data

Dec. 22, 1993 [JP] Japan .................................. 5-324198

[51] Int. Cl.$^6$ .................................................. H03M 1/22
[52] U.S. Cl. ...................... 341/5; 364/709.1; 364/709.11; 364/190
[58] Field of Search ........................ 341/5; 178/18, 178/19; 345/179; 364/701.11, 709.1

[56] References Cited

U.S. PATENT DOCUMENTS

| | | | |
|---|---|---|---|
| 5,218,174 | 6/1993 | Gray et al. | 178/19 |
| 5,349,139 | 9/1994 | Verrier et al. | |
| 5,528,002 | 6/1996 | Katabami | 178/18 |

FOREIGN PATENT DOCUMENTS

| | | |
|---|---|---|
| 63-70326 | 3/1988 | Japan . |
| 3-189716 | 8/1991 | Japan . |
| 3-189717 | 8/1991 | Japan . |

Primary Examiner—Fritz Fleming
Assistant Examiner—Jason L. W. Kost
Attorney, Agent, or Firm—Lowe, Price, LeBlanc & Becker

[57] ABSTRACT

A position detecting device and a position pointing device thereof, which are capable of transmitting much information at high speed without lowering the sampling rate of coordinate detection. The position pointing device controls the resonance characteristic of a resonance circuit to one of at least four different resonance characteristics in accordance with at least two bits of binary code out of a plurality of bits of binary code, which represent pointing device information, at a preselected timing. A tablet detects the resonance characteristic of the resonance circuit by resonance characteristic detecting means from an electric wave generated from the resonance circuit at the preselected timing and converts it into at least two corresponding bits of binary code, thus enabling the transmission of information of two bits or more at a time.

15 Claims, 6 Drawing Sheets

POSITION DETECTING DEVICE AND POSITION POINTING DEVICE THEREFOR

BACKGROUND OF THE INVENTION

1. Field of the Invention

The present invention relates to improvements in a position detecting device and a position pointing device therefor, which employ electric waves.

2. Description of the Related Art

Prior to the instant application, the applicant has proposed, in Japanese Patent Application No. 61-213970 (Japanese Patent Laid-Open No. 63-70326), a position detecting device in which a sensing section exchanges electric wave signals with a position pointing device so as to detect the coordinate value of a position pointed by the position pointing device.

Briefly, the position detecting device disclosed in Japanese Patent Laid-Open No. 63-70326 has a plurality of loop coils constituting the sensing section and adapted to transmit an electric wave of a predetermined frequency. The electric wave is received by a resonance circuit provided in the position pointing device so that resonance takes place in the resonance circuit to emit electric wave. This electric wave is received by the loop coil so that a voltage is inducted in the loop coil. This operation is conducted successively on the plurality of loop coils constituting the sensing section, so that the coordinate value of the position pointed by the position pointing device is determined based on the levels of the voltages induced in the loop coils.

The position detecting device of the type described faces a demand for the ability to enter various kinds of information in addition to the coordinate value of a pointed position, such as information which indicates that the position pointing device, e.g., a pen or the like, has been set to a position for pointing a definite position (this state will be referred to as "pen-down state," hereinafter), information concerning the type of the position pointing device, e.g., a pen, a cursor or the like, as well as a demand for inputting, together with the coordinate values, information for continuously varying values of parameters other than the coordinate information, such as, for example, thickness or width of a line and hue or density (brightness) of the position or area appointed by the pointing device.

To cope with such demands, the position pointing device disclosed in Japanese Patent Laid-Open No. 63-70326 employs a manual switch which selectively connects, to the resonance circuit which is constituted by a coil and a capacitor, an additional capacitor so as to slightly vary the resonance frequency, the slight variation in the resonance frequency being detected as a variation in the phase angle so as to be used as information indicative of the aforesaid various types of information (hereinafter referred to as "pointing device information").

The device according to the aforesaid Japanese Patent Laid-Open No. 63-70326 requires, however, that the range, over which the resonance frequency of the resonance circuit varies as the switch is operated, precisely coincide with a predetermined range, which is centered at the frequency of the electric wave transmitted from the sensing section. A laborious adjusting work is required to attain such matching of the frequency ranges. Further, the detectable range of phase angle is limited to be about −60° to about +60°. Furthermore, a certain tolerance for the phase angle to be detected has to be set in order to accommodate any change in the inductance of the coil and in the capacitance of the capacitor of the resonance circuit caused by a change in the ambient temperature. These problems led to a limited number of types of pointing device information, which can be entered, and especially when the resonance frequency is designed to continuously change according to pen pressure, no pointing device information other than pen pressure information can be entered.

Under this circumstance, the same applicant proposed a position detecting device and a position pointing device therefor in Japanese Patent Application No. 1-327276 (Japanese Patent Laid-Open No. 3-189716) and Japanese Patent Application No. 1-327277 (Japanese Patent Laid-Open No. 3-189717), wherein the position pointing device is provided with a code generator, which issues a plurality of particular bits of binary code when a switch is operated, an additional capacitor is connected and disconnected to and from the coil and capacitor composing a resonance circuit via an electronic switch in accordance with a plurality of bits of binary code issued from the code generator in order to cause the resonance frequency to change slightly according to the plurality of bits of binary code, and the slight change in the resonance frequency caused by the binary code is detected as a change in phase angle to reproduce the binary code, thereby making it possible to enter a number of pieces of pointing device information, which corresponds to the bit number of a plurality of bits of binary code.

In the position detecting device described above, however, a change in the resonance frequency of the resonance circuit causes a change in the level of a received signal (induced voltage); therefore, accurate detection of a coordinate value cannot be performed if the resonance frequency changes according to the aforesaid binary code during coordinate detection. To cope with the problem, the device according to Japanese Patent Laid-Open Nos. 3-189716 and 3-189717 is provided with a time length for identifying a code, which is entirely independent of the time length for the coordinate detection, and the resonance frequency of the resonance circuit is changed in accordance with a plurality of bits of binary code at each fixed timing specified by a tablet during the time length, thereby entering (transmitting) the pointing device information represented by the plurality of bits of binary code from the position pointing device to the tablet.

In the apparatus according to the foregoing Japanese Patent Laid-Open Nos. 3-189716 and 3-189717, the number of pieces of transmittible pointing device information can be increased as many as it is necessary by increasing the bit number of binary code. This, however, posed a problem in that a greater bit number results in a longer time length required for identifying the code, leading to accordingly a lower sampling rate of the coordinate detection between adjoining coordinate detection time lengths.

SUMMARY OF THE INVENTION

In view of the above-described problems of the prior art, the present invention is aimed at providing a position detecting device and a position pointing device therefor, capable of transmitting a substantial information without reducing the sampling rate of the coordinate detection.

According to one aspect of the present invention, there is provided a position detecting device, which includes a position pointing device having at least a resonance circuit, and a tablet designed to determine a coordinate value of a position pointed by the position pointing device by transmitting and receiving an electric wave to and from the position pointing device, the tablet generating an electric wave, which includes predetermined timing information, the predetermined timing information being extracted from an induced voltage, which occurs in the resonance circuit of the position pointing device, which has received said electric wave, the resonance characteristic of the resonance circuit of the position pointing device being changed in accordance with a plurality of bits of binary code representing pointing device information at a particular timing based on the predetermined timing information, and the resonance characteristic of the resonance circuit being detected from an electric wave generated from the resonance circuit of the position pointing device at the particular timing, thereby reproducing a plurality of bits of binary code, which represent the pointing device information. The aforesaid position pointing device has a code setting means for issuing at least two bits of binary code out of the plurality of bits of binary code representing the pointing device information at a preselected timing among the particular timings, and a resonance characteristic control means, which controls the resonance characteristic of the resonance circuit to one of at least four different resonance characteristics in accordance with the foregoing at least two issued bits of binary code. The tablet has a resonance characteristic detecting means, which detects the resonance characteristic of the resonance circuit from the electric wave generated from the resonance circuit of the position pointing device at the preselected timing among the particular timings and outputs at least two corresponding bits of binary code, and a code reproducing means, which reproduces a plurality of bits of binary code, which represent the pointing device information, from at least two bits of binary code output from the resonance characteristic detecting means.

The above and other objects, features and advantages of the present invention will become clear from the following description when the same is read in conjunction with the accompanying drawings.

DESCRIPTION OF THE PREFERRED EMBODIMENTS

Before turning to the description of preferred embodiments, a description is given of a basic form of the present invention.

Figure 1:
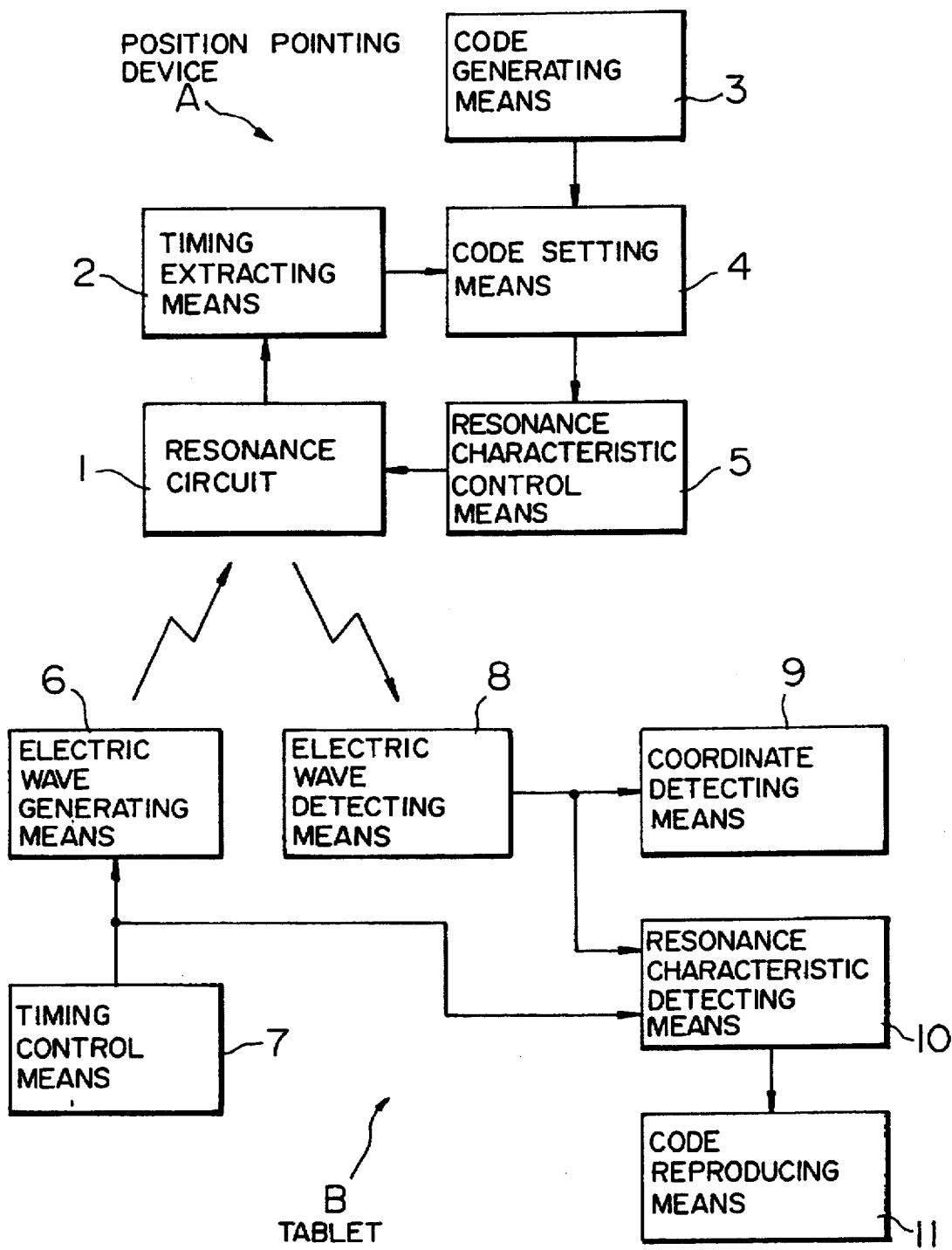
FIG. 1 is a block diagram illustrative of a basic form of the position detecting device and the position pointing device thereof in accordance with the present invention.

FIG. 1 is the block diagram showing the basic form of the position detecting device and the position pointing device therefor according to the present invention. Position pointing device A in accordance with this basic form of the invention has a resonance circuit 1, a timing extracting means 2 for extracting predetermined timing information from induced voltage including the predetermined timing information, which voltage being generated in the resonance circuit 1. Position pointing device A also has a code generating means 3 for generating a plurality of bits of binary code, which represent pointing device information, a code setting means 4 for outputting at least two bits of binary code out of the plurality of bits of binary code representing the pointing device information at a preselected timing among particular timings based on the predetermined timing information, and a resonance characteristic control means 5 for controlling the resonance characteristic of the resonance circuit 1 to one of at least four different resonance characteristics in accordance with the issued at least two bits of binary code.

Tablet B has an electric wave generating means 6 for generating an electric wave, which drives the resonance circuit 1, a timing control means 7 for controlling the electric wave generated by the electric wave generating means 6 so that it includes the predetermined timing information, an electric wave detecting means 8 for detecting the electric wave generated by the resonance circuit 1 of position pointing device A, and a coordinate detecting means 9 for determining a coordinate value of a position specified by position pointing device A from the electric wave detected by the electric wave detecting means 8. Tablet B further has a resonance characteristic detecting means 10 for detecting the resonance characteristic of the resonance circuit 1 of position pointing device A from the electric wave detected at the preselected timing among the particular timings based on the predetermined timing information and outputting at least two bits of binary code, and a code reproducing means 11 for reproducing the plurality of bits of binary code representing the pointing device information by at least two bits of binary code issued from the resonance characteristic detecting means 10.

The induced voltage, which includes the predetermined timing information, is generated in the resonance circuit 1 by the electric wave, which includes the predetermined timing information and which is generated by the electric wave generating means 6 of tablet B, the predetermined timing information being expressed by, for example, the duration of electric wave, and more particularly by the duration of the electric wave, which lasts for a predetermined time length or more and after that occurs intermittently at predetermined intervals, lasting for a certain duration, which is much shorter than the foregoing predetermined time length. In this case, the timing extracting means 2 detects the voltage induced in the resonance circuit 1 by the aforesaid electric wave, subjects it through a low-pass filter (integration circuit) having a predetermined time constant to derive a voltage of a certain level or higher, thereby extracting the predetermined timing information.

The code generating means 3 is composed primarily of a well-known code generator for generating a plurality of particular bits of binary code when each of a plurality of switches is operated and a well-known analog-digital converting circuit for converting an analog signal, which corresponds to the operation represented by the continuous amount of pen pressure or the like, into a digital signal.

The code setting means 4 outputs a plurality of, e.g., two bits, of binary code, which represent the pointing device information at a specific timing based on the aforesaid predetermined timing information and more particularly at preselected timing among the timings, at which the induced voltage lasts for a predetermined time length in the resonance circuit 1 and after that occurs intermittently for a certain duration, which is much shorter than the predetermined time length, at predetermined intervals. At this time, for instance, if the number of bits of binary code representing the pointing device information is eight, then two bits of binary code are derived four times in total at time slots when the induced voltage occurs intermittently.

The resonance characteristic control means 5 changes the resonance characteristic based on the resonance frequency, loss, attenuation level, or any combination of these, of the resonance circuit 1 by connecting and disconnecting an additional capacitor, coil or resistor to and from the typical resonance circuit 1 constituted, for example, of coils and capacitors via a switch, which is turned ON/OFF in accordance with the binary code.

The electric wave generating means 6 includes an auxiliary antenna coil provided on or in the vicinity of a plurality of loop coils arranged, for example, in a position detecting direction, and an AC signal generating means for generating an AC signal for producing the electric wave for driving the resonance circuit 1 of position pointing device A, typically an AC signal of a frequency nearly equal to the resonance frequency of the resonance circuit 1. The electric wave detecting means 8 is constituted of a plurality of loop coils arranged in the same position detecting direction as that of the loop coils constituting the electric wave generating means 6 or in a completely different position detecting direction or of the plurality of loop coils and an auxiliary antenna coil provided in the vicinity thereof.

The timing control means 7 generates the electric wave, which includes the predetermined timing information expressed by duration and more particularly the electric wave, which lasts for a predetermined time length or more and after that intermittently occurs for a certain duration, which is much shorter than the predetermined time length, at predetermined intervals by connecting and disconnecting, for example, the aforesaid plurality of loop coils or auxiliary antenna coil to and from the AC signal generating means.

The coordinate detecting means 9 detects, for instance, the level of a plurality of induced voltages generated in the aforesaid plural loop coils by the electric wave produced by the resonance circuit 1 of position pointing device A and it detects the maximum value in the level distribution, i.e., the coordinate value of the position pointed by position pointing device A.

The resonance characteristic detecting means 10 detects, for example, the levels of the voltages induced in the foregoing loop coils or the auxiliary antenna coils or the difference in phase from the above-mentioned AC signal from the electric wave generated by the resonance circuit 1 of position pointing device A, more particularly, the electric wave generated at aforesaid preselected timing among the particular timings based on the predetermined timing information, i.e., the timing at which the resonance characteristic of the resonance circuit 1 is controlled in accordance with at least two bits of binary code out of the plurality of bits of binary code representing the pointing device information, and based on the detection result, the resonance characteristic detecting means 10 detects the resonance characteristic of the resonance circuit 1 of position pointing device A, then outputs at least two corresponding bits of binary code.

The code reproducing means 11 outputs, for example, two bits of binary code, which are received from the resonance characteristic detecting means 10, without modification if the number of the bits of binary code representing the pointing device information is two; or it accumulates the two bits of binary code, which are received from the resonance characteristic detecting means 10, for four timings and outputs them if the number of the bits of the binary code representing the pointing device information is eight.

In FIG. 1, the electric wave generating means 6 for generating the electric wave, which drives the resonance circuit 1 of position pointing device A, is controlled by the timing control means 7 so that the electric wave including the predetermined timing information is, for example, continuously generated for a predetermined time length, then generated intermittently for a given duration, which is much shorter than the predetermined time length, at predetermined intervals. The electric wave is received by the resonance circuit 1 of position pointing device A and it generates induced voltage, which includes the predetermined timing information. The timing extracting means 2 extracts the predetermined timing information from the induced voltage and supplies it to the code setting means 4. The code setting means 4 outputs, for example, two bits of binary code out of the plurality of bits of binary code denoting the pointing device information produced by the code generating means 3 to the resonance characteristic control means 5 at the preselected timing among the particular timings based on the predetermined timing information, e.g., the timings at which the induced voltage is intermittently generated. The resonance characteristic control means 5 changes the resonance characteristic such as the resonance frequency of the resonance circuit 1 in accordance with the received binary code.

At this time, the electric wave, which is emitted from the resonance circuit 1 and which has a different frequency from that of the electric wave produced by the electric wave generating means 6, is detected by the electric wave detecting means 8. The resonance characteristic detecting means 10 detects the resonance characteristic of the resonance circuit 1 of position pointing device A from the electric wave detected by the electric wave detecting means 8 and outputs corresponding two bits of binary code to the code reproducing means 11. In response to the two bits of binary code received, the code reproducing means 11 outputs it as it is or accumulates a required number of bits and outputs it as the pointing device information in accordance with the number of bits of binary code representing the pointing device information. The coordinate detecting means 9 detects the coordinate value of the position specified by position pointing device A from the electric wave detected by the electric wave detecting means 8, e.g., from the intensity distribution thereof.

The following describes the embodiments according to the present invention with reference to the attached drawings.

Figure 2:
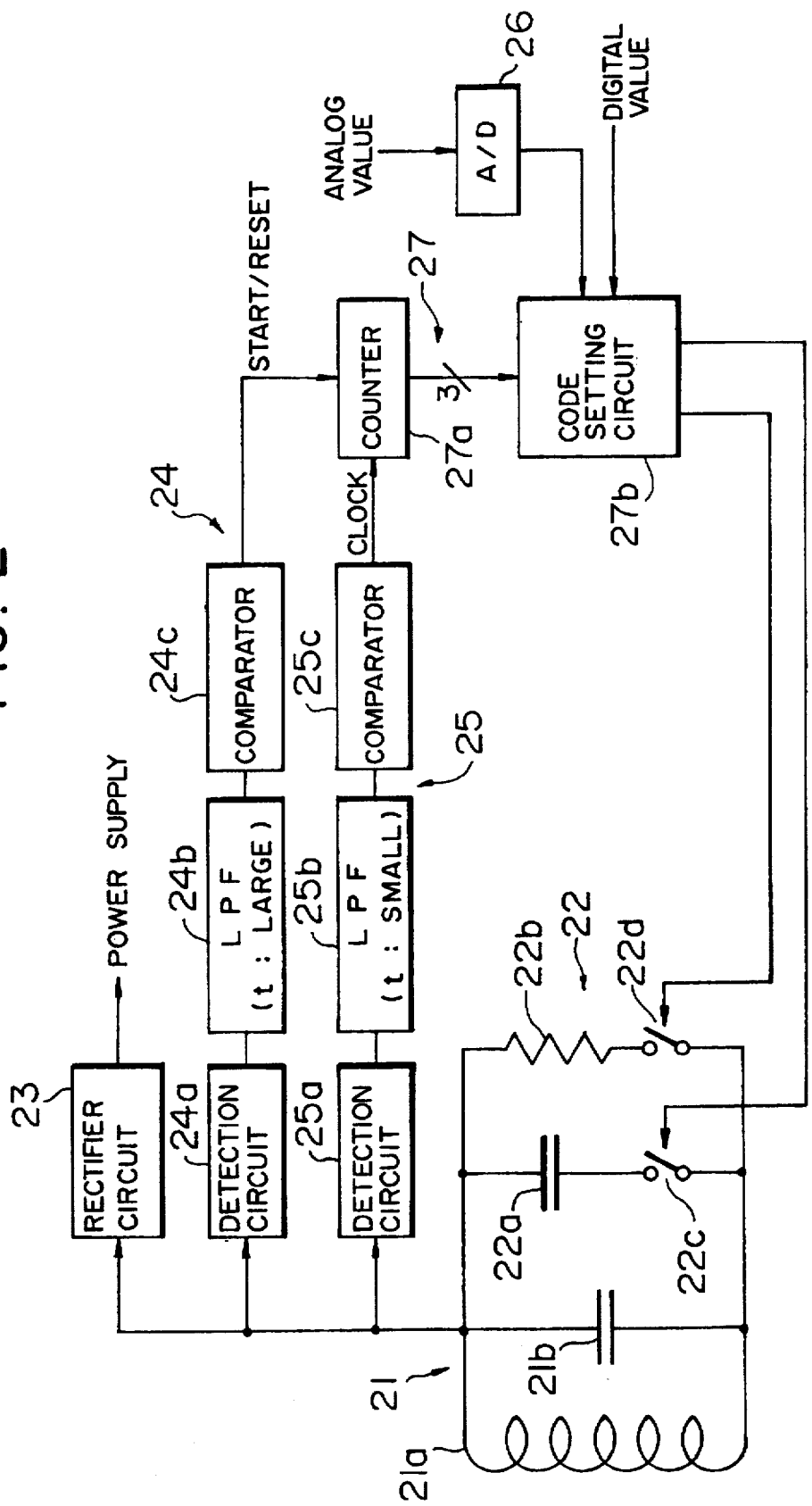
FIG. 2 is a configuration diagram illustrative of a first embodiment of the position pointing device in accordance with the present invention.

FIG. 2 shows the first embodiment of the position pointing device according to the present invention. In the Figure, position pointing device A includes a coil 21a, capacitors 21b, 22a, a resistor 22b, switches 22c, 22d, a rectifier circuit 23, detection circuits 24a, 25a, low-pass filters 24b, 25b (LPF), comparators 24c, 25c, an analog-digital (A/D) converting circuit 26, a counter 27a, and a code setting circuit 27b.

The coil 21a and the capacitor 21b are connected in parallel and they constitute a well-known resonance circuit 21. A resonance circuit control means 22 has the capacitor 22a and the resistor 22b connected in parallel to the capacitor 21b of the resonance circuit 21 via the switches 22c and 22d, respectively, and it changes the resonance frequency and loss of the resonance circuit 21 according to one of four combinations of the ON and OFF of the switches 22c, 22d, thereby controlling the resonance characteristic of the resonance circuit 21 to one of four different resonance characteristics.

The rectifier circuit 23 takes out DC voltage from the induced voltage generated in the resonance circuit 21 and supplies it as a line voltage to other circuit.

The detection circuit 24a, the low-pass filter 24b, and the comparator 24c constitute an actuation timing generating circuit 24, which takes out only the induced voltage lasting for a predetermined time length or more from the induced voltage generated in the resonance circuit 21 by using the low-pass filter 24b having a relatively long time constant (t), then it shapes the waveforms thereof to produce an actuation timing signal. The detection circuit 25a, the low-pass filter 25b, and the comparator 25c constitute a clock generating circuit 25, which takes out the induced voltage, which is intermittently generated for a fixed duration, which is much shorter than the predetermined time length, at predetermined intervals, by means of the low-pass filter 25b having a relatively short time constant (t), then it shapes the waveform thereof to produce a clock. The actuation timing generating circuit 24 and the clock generating circuit 25 constitute a timing extracting means.

The A/D converting circuit 26 converts an analog value corresponding to the pointing device information, e.g., the analog voltage output from a pressure sensitive element, not shown, into a digital value of a plurality of bits, e.g., eight bits, that is, binary code, in accordance with the analog value such as a pen pressure value corresponding to the pointing device information. The A/D converting circuit 26 constitutes the code generating means, which generates a plurality of bits of binary code representing the pointing device information.

The counter 27a and the code setting circuit 27b are actuated by the actuation timing signal and each time the count value on the counter 27a, which counts the clock, is updated, code setting circuit 27 outputs in succession two bits out of eight bits of digital value applied to the code setting circuit 27b from the A/D converting circuit 26 or other code generator, not shown, to the switches 22c, 22d. The counter 27a and the code setting circuit 2b constitute a code setting means 27, which outputs the two bits of binary code among a plurality of bits of binary code representing the pointing device information in synchronization with a clock following the input of the actuation timing signal. The counter 27a is reset to zero when it counts up to a preset value.

Figure 3:
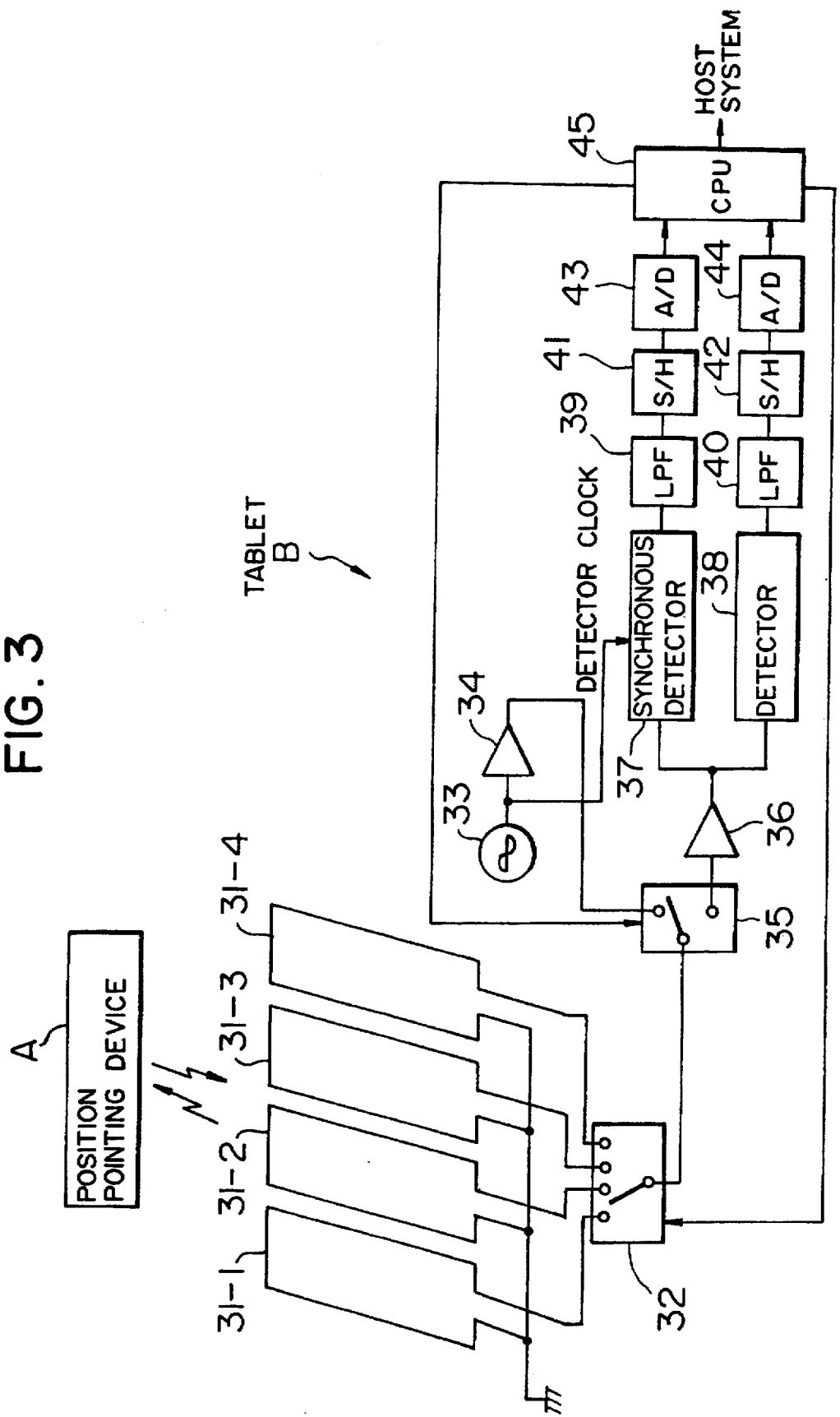
FIG. 3 is a configuration diagram illustrative of a first embodiment of the tablet of the position detecting device in accordance with the present invention.

FIG. 3 is a diagram of a first embodiment of the tablet of the position detection device according to the present invention. In the Figure, tablet B has loop coils 31-1, 31-2, 31-3, and 31-4, a selector circuit 32, an oscillator 33, a current driver 34, a transmit/receive switching circuit 35, a receiving amplifier 36, a synchronous detector 37, a detector 38, low-pass filters (LPF) 39, 40, sample holding circuits (S/H) 41, 42, analog-digital (A/D) converting circuits 43, 44, and a central processing unit (CPU) 45.

The loop coils 31-1 through 31-4 are provided and arranged nearly in parallel to each other in the direction detecting direction, one end of each of them being connected to the selector circuit 32, while the other end being grounded in common. The selector circuit 32 selects one loop coil among the loop coils 31-1 through 31-4 in accordance with a selection signal received from the central processing unit 45 in a manner to be discussed later.

The oscillator 33 generates a sinusoidal AC signal having a frequency nearly equal to the resonance frequency of the resonance circuit 21 of pointing device A and sends it to the current driver 34 and the synchronous detector 37. The current driver 34 converts the AC signal to an electric current and sends it to the transmit/receive switching circuit 35. The transmit/receive switching circuit 35 connects the loop coil, which has been selected by the selector circuit 32, to the current driver 34 and the receiving amplifier 36 alternately in accordance with a transmit/receive switching signal received from the central processing unit 45.

The receiving amplifier 36 amplifies the induced voltage, which is generated in the preselected loop coil and sent to the receiving amplifier 36 via the selector circuit 32 and the transmit/receive switching circuit 35, and sends the amplified induced voltage to the synchronous detector 37 and amplitude detector 38.

The synchronous detector 37 synchronously detects the induced voltage generated in the preselected loop coil, i.e., the received signal, with the AC signal received from the oscillator 33 used as the detection signal and sends it to the low-pass filter 39. The detector 38 detects the amplitude of the induced voltage generated in the preselected loop coil, i.e., the received signal, and sends it to the low-pass filter 40.

The low-pass filters 39, 40 have a cut-off frequency, which is much lower than the resonance frequency of the resonance circuit 21, to convert the output signals of the synchronous detector 37 and the detector 38 into DC signals and send them out to the A/D converting circuits 43, 44 via the sample holding circuits 41, 42. The A/D converting circuits 43, 44 respectively subject the outputs of the low-pass filters 39, 40 to the analog-digital conversion and send them out to the central processing unit 45.

The central processing unit 45 calculates the position of the resonance circuit 21 in accordance with the level distribution of the received signals, which were generated in the loop coils 31-1 through 31-4 during the coordinate detection to be discussed later and which have been converted to digital values by the A/D converting circuit 44, detects a phase difference in accordance with the level differences in the received signals, which were produced in the loop coil located most closely to the position of the resonance circuit 21 among the loop coils 31-1 through 31-4 at a timing immediately after the electric wave was generated continuously for a predetermined time length or more during the code identifying period to be discussed later and also at a timing immediately after each timing, at which the electric wave was generated intermittently for a fixed duration, which is much shorter than the predetermined time length, at predetermined intervals, and which have been converted to digital values through the A/D converting circuit 43, detects the loss in accordance with the level differences in the received signals, which have been converted to digital values through the A/D converting circuit 44, and detects the resonance characteristic of the resonance circuit 21 at each of the timings mentioned above, thereby reproducing a plurality of bits of binary code representing the pointing device information.

Figure 4:
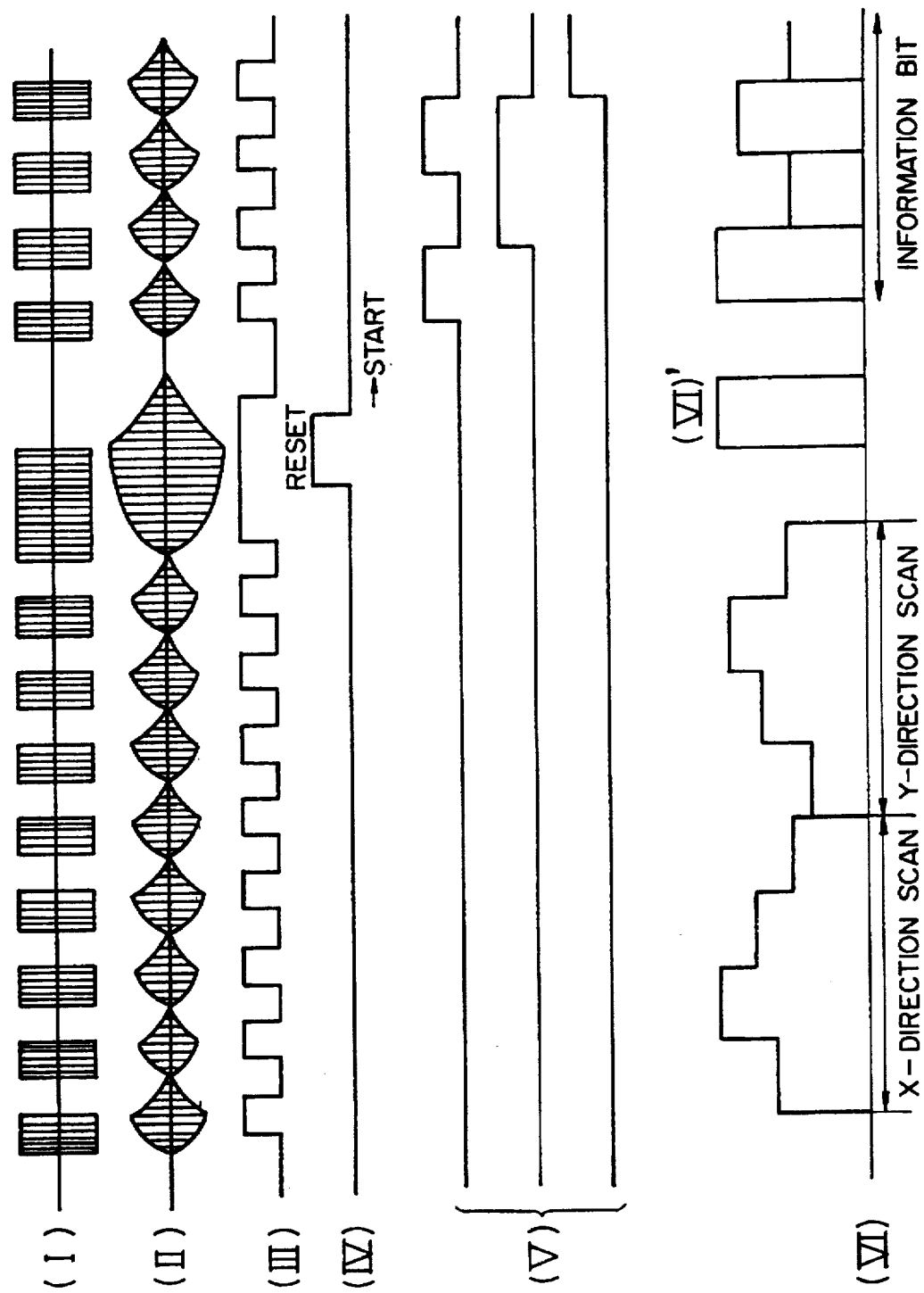
FIG. 4 is an illustration of operation waveforms in the first embodiment.

FIG. 4 includes illustration of the operation waveform in the first embodiment. The following describes the operations of the position detecting device and the position pointing device in connection with the Figure. Tablet B described above is designed for position detection in one direction; however, in this case, a plurality of loop coils similar to the loop coils 31-1 through 31-4 are arranged so that they cross orthogonally with Tablet B, selector circuits similar to those described above are provided, and other circuits are used in a switching mode so as to alternately perform position detection, thus detecting a pointed position in two orthogonal directions (x and y directions). The Figure shows the waveforms obtained from the configuration described above.

The operations of the devices are roughly divided into a coordinate detection period and a code identifying period, and these two are normally repeated alternately.

During the coordinate detection period, the central processing unit 45 controls the transmit/receive switching circuit 35 so that the output of the selector circuit 32 is connected to the current driver 34 and the receiving amplifier 36 alternately for a predetermined duration at fixed intervals, and also controls the selector circuit 32 so that the loop coil located most closely to position pointing device A is selected among the loop coils 31-1 through 31-4 when the current driver 34 is connected, i.e., when the electric current is generated, while the loop coils 31-1 through 31-4 are selected in sequence when the receiving amplifier 36 is connected, i.e., when the electric wave is detected.

During the code identifying period, the central processing unit 45 controls the transmit/receive circuit 35 so that the output of the selector circuit 32 is connected continuously to the current driver 34 for a predetermined time length, which is much longer than the predetermined duration mentioned above and after that connected alternately to the current driver 34 and the receiving amplifier 36 for a given duration, which is much shorter than the predetermined time length, at predetermined intervals, and it also controls the selector circuit 32 so that the loop coil located most closely to position pointing device A is selected among the loop coils 31-1 through 31-4 when the current driver 34 is connected, i.e., when the electric current is generated, and also when the receiving amplifier 36 is connected, i.e., when the electric current is detected.

The operation of the tablet during the coordinate detection period will be omitted because it is well known in the previously mentioned Japanese Patent Laid-Open No. 63-70326, No. 3-189716, and No. 3-189717, etc. Electric current I, which is generated for a predetermined duration at fixed intervals in the loop coil closest to the resonance circuit 21 of position pointing device A of tablet B during the coordinate detection period causes similar induced voltage II to appear in the resonance circuit 21 of position pointing device A. Electric wave I and induced voltage II are shaped into a clock III by the clock generating circuit 25 before they are supplied to the counter 27a. At this time, however, there is no actuation timing signal; therefore, the counter 27a does not initiate counting and the code setting circuit 27b is not actuated. Accordingly, the resonance characteristic of the resonance circuit 21 stays unchanged.

During the code identifying period, which follows the coordinate detection period and when electric wave I, which lasts for a predetermined time length or more, and which is much longer than the aforesaid duration, is generated from the loop coil closest to the resonance circuit 21 of position pointing device A of tablet B, electric wave I causes like induced voltage II to appear in the resonance circuit 21 of position pointing device A. Induced voltage II causes timing signal IV to be generated in the actuation timing generating circuit 24. Actuation timing signal IV causes the counter 27a to start counting.

After that, electric wave I generated in the loop coil closest to the resonance circuit 21 of position pointing device A of tablet B for a fixed duration, which is well shorter than the predetermined time length, at predetermined intervals causes like induced voltage II to be generated in the resonance circuit 21 of position pointing device A, and these are shaped into clock III through the clock generating circuit 25, output value V of the counter 27a incrementing each time clock III is received.

Induced voltage II based on the electric wave, which has lasted for the predetermined time length or more, causes received signal (induced voltage) VT to be produced in the loop coil located most closely to the resonance circuit 21 of position pointing device A of tablet B as in the coordinate detection period. At this point, however, the counter 27a is not counting yet and the code setting circuit 27b is outputting no binary code to the switches 22c, 22d. Hence, the output values of the A/D converting circuits 43, 44 based on the induced voltage VT provide the reference values for detecting the phase difference and loss.

The code setting circuit 27b, which has received output value V from the counter 27a successively outputs two bits out of the eight bits of the digital value, which is received from the A/D converting circuit 26 or other code generator, not shown, to the switches 22c, 22d each time output value V is updated. The switches 22c, 22d turn ON or OFF in accordance with the two bits of the digital value to change the resonance characteristic of the resonance circuit 21.

Such a change in the resonance characteristic causes a change in the frequency or voltage value of induced voltage VI generated in the loop coil closest to the resonance circuit 21 of position pointing device A of tablet B; the change is sent out as an output value, which has a level difference from the output value based on induced voltage VT. The central processing unit 45 compares the output values of the A/D converting circuits 43, 44, which are obtained in synchronization with the timing of the electric wave, which is intermittently produced for a fixed duration at predetermined intervals, with the output values of the A/D converting circuits 43, 44, which are obtained in synchronization with the timing of the electric wave, which is continuously generated for the predetermined time length or more in order to detect the phase difference and loss. Based on the detected phase difference and loss, the central processing unit 45 reproduces the states of the switches 22c, 22d, i.e., the two bits of binary code, and it further accumulates binary code for four timings so as to reproduce the eight bits of binary code denoting the pointing device information, then sends the reproduced eight bits of binary code to the host system together with the coordinate value of the pointed position.

After that, the coordinate detection period reoccurs and the same coordinate detection and code identification as those discussed above are repeated.

Thus, according to the embodiment, the two bits of binary code are transmitted at a preselected timing in predetermined time slots; therefore, the pointing device information expressed by a plurality of bits of binary code are delivered from position pointing device A to tablet B more quickly, enabling more information to be transmitted more quickly without sacrificing the sampling rate of coordinate detection.

Figure 5:
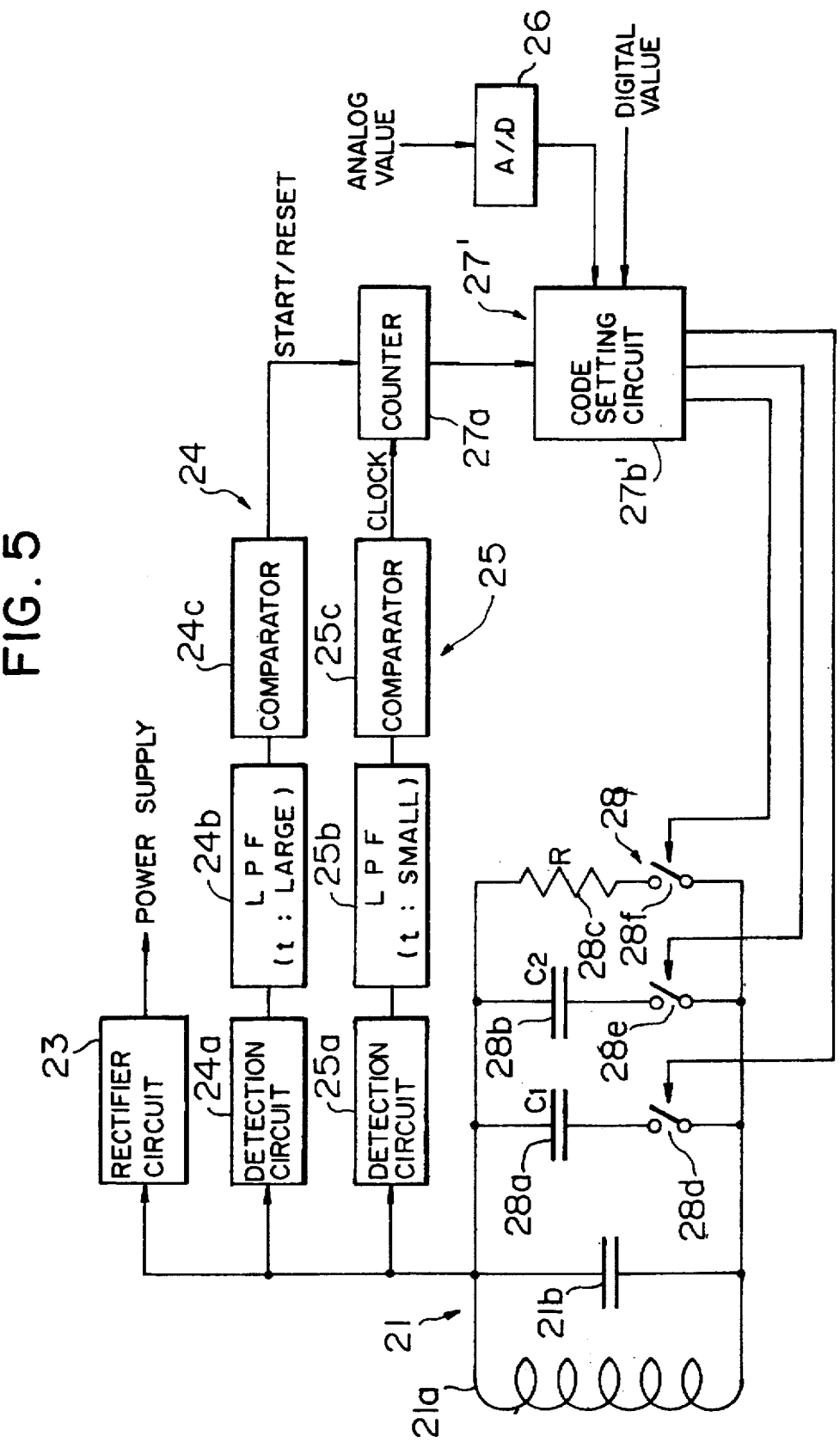
FIG. 5 is a configuration diagram illustrative of a second embodiment of the position pointing device in accordance with the present invention.

FIG. 5 shows the second embodiment of the position pointing device according to the present invention. This embodiment gives an example, wherein three bits of binary code are transmitted. In FIG. 5, a resonance circuit control means 28 includes capacitors 28a, 28b (having different capacitance values), a resistor 28c, and switches 28d, 28e, 28f. The capacitors 28a, 28b and the resistor 28c are respectively connected in parallel to the capacitor 21b of the resonance circuit 21 via the switches 28d, 28e, 28f. The resonance circuit control means 28 controls the resonance characteristic of the resonance circuit 21 to one of eight different resonance characteristics by changing the resonance frequency and loss of the resonance circuit 21 in accordance with eight different combinations of the ON and OFF of the switches 28d, 28e, 28f.

A code setting circuit 27b' successively outputs three bits of the digital value of a plurality of bits received from the A/D converting circuit 26 or other code generator, not shown, to the switches 28d, 28e, 28f simultaneously each time the count value of the counter 27a is updated. The code setting circuit 27b' together with the counter 27a constitute a code setting means 27', which outputs three bits of binary code out of a plurality of bits of binary code representing the pointing device information, in synchronization with the clock after the actuation timing signal is received. The rest of the form of the position pointing device is the same as the embodiment shown in FIG. 2 and this position pointing device can be used for the position detecting device illustrated in FIG. 3 simply by adding a slight change in the code reproducing program.

According to the position pointing device of the embodiment, the number of bits, which can be transmitted at a preselected timing, increases and more information can be delivered accordingly. Moreover, the same amount of information can be transmitted more quickly, thus achieving faster sampling in the coordinate detecting device.

Figure 6:
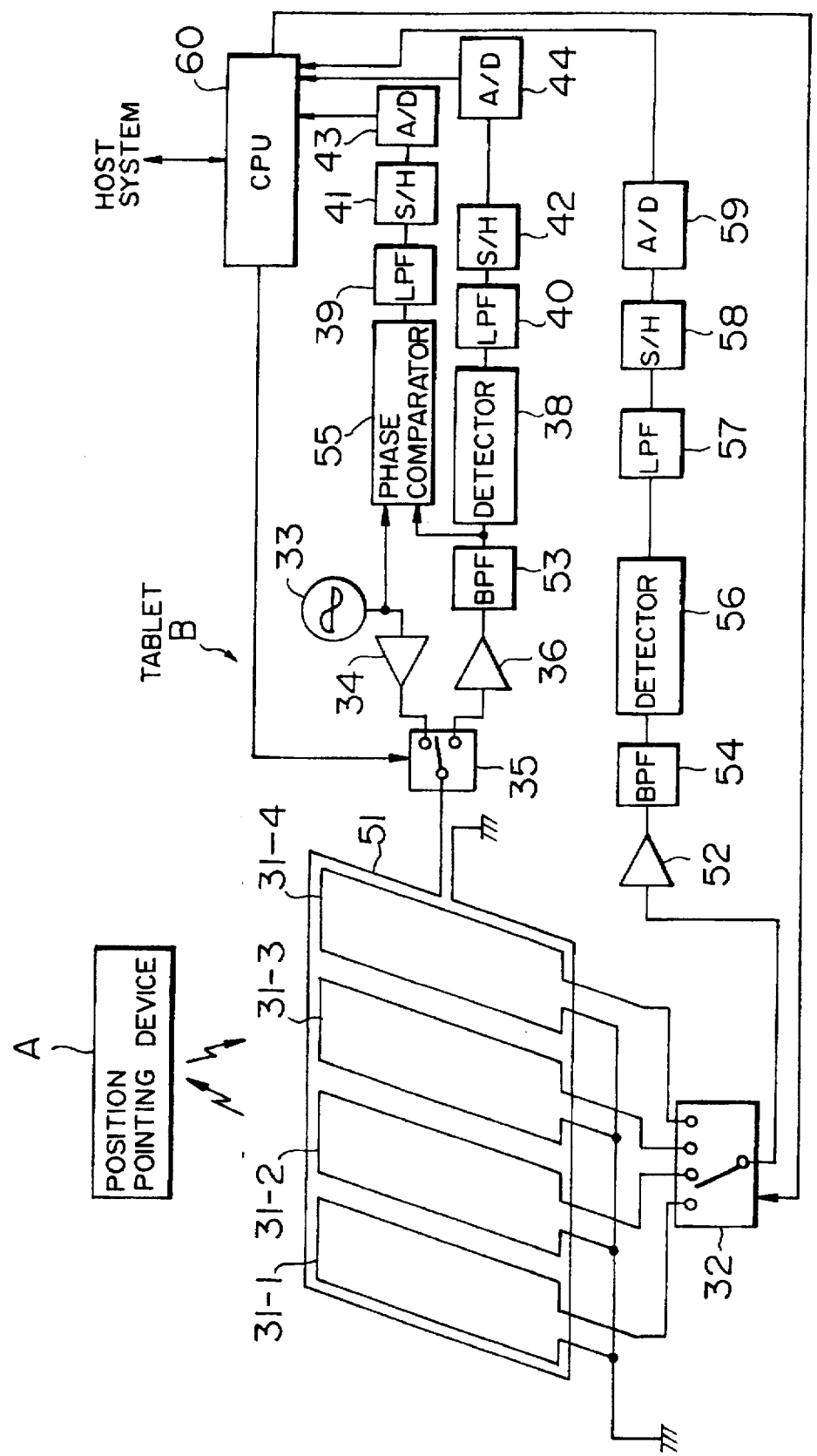
FIG. 6 is a configuration diagram illustrative of a second embodiment of the tablet of the position detecting device in accordance with the present invention.

FIG. 6 shows the second embodiment of the tablet of the position detecting device according to the present invention. This embodiment gives an example, wherein an auxiliary antenna coil is used to generate electric waves and to receive electric waves related to code identification. In the Figure, reference numeral 51 denotes an auxiliary antenna coil, which is arranged so as to surround the loop coils 31-1 through 31-4, one end thereof being connected to a switching connection circuit 35, while the other end thereof being grounded. Reference numeral 52 denotes a receiving amplifier connected directly to the selector circuit 32.

Reference numerals 53, 54 indicate band-pass filters, which employ the resonance frequency of the resonance circuit 21 as the center frequency thereof. The band-pass filters 53, 54 take out only a component in the vicinity of the resonance frequency from the induced voltage mentioned above via the receiving amplifiers 36 and 52, respectively. Reference numeral 55 denotes a phase comparator, which compares the phase of an output signal of the band-pass filter 53, i.e., the resonance frequency component of the induced voltage generated in the auxiliary antenna coil 51, and the phase of an AC signal received from the oscillator 33 and sends out a phase difference signal to the low-pass filter 39.

A detector 56, a low-pass filter (LPF) 57, a sample holding circuit (S/H) 58, and an analog-digital (A/D) converting circuit 59 detect received signals, which are generated in the loop coils 31-1 through 31-4 and output via the selector circuit 32, the receiving amplifier 52, and the band-pass filter 54, convert them into DC signals, and further convert them to digital signals.

A central processing unit (CPU) 60 calculates the position of the resonance circuit 21 in accordance with the level distribution of the received signals, which were generated in the loop coils 31-1 through 31-4 during the coordinate detection and which have been converted to digital values by the A/D converting circuit 59, detects a phase difference in accordance with the level differences of the received signals, which were produced in the auxiliary antenna coil 51 at a timing immediately after the electric wave was generated continuously for a predetermined time length or more during the code identifying period and also at a timing immediately after each timing, at which the electric wave was generated intermittently for a fixed duration, which is well shorter than the predetermined time length, at predetermined intervals, and which have been converted to digital values through the A/D converting circuit 43, detects the loss in accordance with the level differences in the received signals, which have been converted to digital values through the A/D converting circuit 44, and detects the resonance characteristic of the resonance circuit 21 at each of the timings mentioned above, thereby reproducing a plurality of bits of binary code representing the pointing device information.

According to this embodiment, the auxiliary antenna coil is employed to generate electric waves and to receive electric waves associated with code identification. This eliminates the need for selecting a loop coil in accordance with the position of position pointing device A when an electric wave is generated during the coordinate detection period or during the code identifying period, thus permitting quicker movement of position pointing device A and reduced load on the central processing unit 60.

In the position pointing device according to the embodiments obtains a power source for driving the circuits from the resonance circuit; however, a separate power supply such as a battery may be provided as an alternative. Further, the embodiments showed examples, wherein the present invention is applied to apparatuses designed to perform coordinate detection by alternately transmitting and receiving electric waves between the position pointing device and the tablet; however, the present invention can be applied also to an apparatus designed to perform coordinate detection by continuously transmitting and receiving electric waves in a similar manner by intermittently transmitting and receiving electric waves only during the code identifying period. Furthermore, in the embodiments, the predetermined timing information is transmitted in terms of the duration of the electric wave; however, the electric wave may alternatively be frequency-modulated for transmission.

Thus, according to the present invention, at least two bits of binary code can be transmitted at a preselected timing; therefore, the pointing device information represented by a plurality of bits of binary code can be transferred from the position pointing device to the tablet at higher speed. This enables much information to be transmitted quickly without causing a lower sampling rate of coordinate detection and it also enables the same amount of information to be transmitted more quickly, leading to a higher sampling speed for coordinate detection.

What is claimed is:

1. In combination, a position pointing device having a housing, a tablet for detecting the position of the device, the housing including:

(a) a source for deriving a signal including N binary bits, where N is an integer greater than one, (b) an AC wave emitter coupled with the source, the wave emitter emitting an AC wave having more than N detectable characteristics controlled by the N bits, a plurality of said characteristics being simultaneously detectable, and (c) an energy emitter for enabling circuitry responsive to the energy emitted by the energy emitter to determine the position of the device relative to the tablet, the tablet responding to the emitted energy to supply a device position indicating signal to circuitry for detecting the position of the device relative to the tablet; and a detector for the N detectable characteristics of the emitted AC wave.

2. The combination of claim 1 wherein the plurality of simultaneously detectable characteristics include angle modulation and amplitude of the emitted wave.

3. The combination of claim 2 wherein the angle modulation is controlled by a reactance with variable discrete values controlled by at least one of the bits and the amplitude is controlled by a conductance with variable discrete values controlled by another of the bits.

4. The combination of claim 1 wherein the detector simultaneously detects at least two of the plurality of detectable characteristics and derives binary signals in accordance with the bits of the source.

5. In combination, a source for deriving a signal including N binary bits, where N is an integer greater than one, a resonant circuit coupled with the source and having more than N detectable characteristics controlled by the N bits, a plurality of said characteristics being simultaneously detectable.

6. The combination of claim 5 wherein the plurality of simultaneously detectable characteristics include angle modulation and amplitude of an AC field emitted by the resonant circuit.

7. The combination of claim 6 wherein the angle modulation is controlled by a reactance of the resonant circuit and the amplitude is controlled by a conductance of the resonant circuit, the reactance having variable discrete values controlled by at least one of the bits, the conductance having variable discrete values controlled by another of the bits.

8. A position pointing device for use with a tablet for emitting a first AC field having a predetermined frequency, the device comprising a resonant circuit having a resonant frequency approximately equal to the predetermined frequency and arranged so it can be coupled with the field, a source for deriving a signal including N binary bits, where N is an integer greater than one, the resonant circuit having a reactance with variable discrete values and a conductance with variable discrete values, the number of said variable discrete values exceeding N, the source and resonant circuit being coupled together so all of the variable discrete values are controlled by the values of the binary bits, and circuitry coupled with the resonant circuit so that in response to the first AC field being coupled to the resonant circuit the resonant circuit emits a second AC field having detectable wave characteristics controlled by the values of the variable reactance and conductance.

9. The position pointing device of claim 8 wherein the circuitry causes the second AC field to have different ones of said wave characteristics during successive time intervals.

10. The position pointing device of claim 8 wherein the circuitry causes the second AC field to have wave characteristics dependent on the position of the device relative to the tablet and independent of the bits, the position dependent wave characteristic being derived during a time interval different from the successive time intervals.

11. A position pointing device for use with a tablet for detecting the position of the device, the device comprising a housing, the housing including:

(a) a source for deriving a signal including N binary bits, where N is an integer greater than one, (b) an AC wave emitter coupled with the source, the wave emitter emitting an AC wave having more than N detectable characteristics controlled by the N bits, a plurality of said characteristics being simultaneously detectable; and (c) an energy emitter for enabling circuitry responsive to the energy emitted by the energy emitter to determine the position of the device relative to the tablet.

12. The position pointing device of claim 11 wherein the plurality of simultaneously detectable characteristics include angle modulation and amplitude of the wave.

13. The position pointing device of claim 11 wherein the wave and energy emitters comprise the same resonant circuit.

14. In combination, a source for deriving a signal including N binary bits, where N is an integer greater than one, a resonant circuit having a reactance with variable discrete values and a conductance with variable discrete values, the number of said variable discrete values exceeding N, the source and resonant circuit being coupled together so all of the variable discrete values are controlled by the values of the binary bits.

15. A position pointing device for use with a tablet for emitting a first AC field having a predetermined frequency, the device comprising a resonant circuit having a resonant frequency approximately equal to the predetermined frequency and arranged so it can be coupled with the field, a source for deriving a signal including N binary bits, where N is an integer greater than one, the resonant circuit being coupled with the source and having more than N detectable characteristics controlled by the N bits, a plurality of said characteristics being simultaneously detectable, and circuitry coupled with the resonant circuit so that in response to the first AC field being coupled to the resonant circuit the resonant circuit emits a second AC field having detectable wave characteristics controlled by the plural detectable characteristics of the resonant circuit.

* * * * *